(12) United States Patent
Zhou et al.

(10) Patent No.: US 12,369,635 B2
(45) Date of Patent: Jul. 29, 2025

(54) VAPORIZER AND CERAMIC VAPORIZATION CORE THEREOF AND METHOD FOR FABRICATING CERAMIC VAPORIZATION CORE

(71) Applicant: SHENZHEN SMOORE TECHNOLOGY LIMITED, Guangdong (CN)

(72) Inventors: Hongming Zhou, Shenzhen (CN); Bo Li, Shenzhen (CN); Shaobin Xiang, Shenzhen (CN); Feng Chen, Shenzhen (CN); Jicai Long, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 411 days.

(21) Appl. No.: 17/747,255

(22) Filed: May 18, 2022

(65) Prior Publication Data
US 2022/0312844 A1    Oct. 6, 2022

Related U.S. Application Data

(63) Continuation of application No. PCT/CN2020/118561, filed on Sep. 28, 2020.

(30) Foreign Application Priority Data

Nov. 26, 2019   (CN) .......................... 201911176626.7

(51) Int. Cl.
*A24F 40/46*   (2020.01)
*A24F 40/10*   (2020.01)
(Continued)

(52) U.S. Cl.
CPC .............. *A24F 40/46* (2020.01); *A24F 40/10* (2020.01); *A24F 40/44* (2020.01); *A24F 40/70* (2020.01);
(Continued)

(58) Field of Classification Search
CPC .......... A24F 40/46; A24F 40/10; A24F 40/44; A24F 40/70; C04B 35/10; C04B 35/64;
(Continued)

(56) References Cited

U.S. PATENT DOCUMENTS

| | | |
|---|---|---|
| 2009/0061003 A1 | 3/2009 | Hermansson et al. |
| 2013/0037041 A1 | 2/2013 | Worm et al. |

(Continued)

FOREIGN PATENT DOCUMENTS

| | | |
|---|---|---|
| CN | 1556781 A | 12/2004 |
| CN | 104119490 A * | 10/2014 |

(Continued)

OTHER PUBLICATIONS

European Patent Office, Supplementary Search Report in European Patent Application No. 20893626.0 (Nov. 25, 2022).
(Continued)

*Primary Examiner* — Jean F Duverne
(74) *Attorney, Agent, or Firm* — Leydig, Voit & Mayer, Ltd.

(57) ABSTRACT

A ceramic vaporization core includes: a porous body; and a heating body disposed on the porous body. The porous body includes at least one porous ceramic layer doped with a hydroxyl group-containing matrix. In an embodiment, the porous ceramic layer doped with the hydroxyl group-containing matrix includes components in parts by weight as follows: 35 to 55 parts by weight of a ceramic powder doped with a hydroxyl group compound; and 25 to 45 parts by weight of a pore-forming agent.

12 Claims, 3 Drawing Sheets

(51) Int. Cl.
- *A24F 40/44* (2020.01)
- *A24F 40/70* (2020.01)
- *C04B 35/10* (2006.01)
- *C04B 35/64* (2006.01)
- *C04B 38/00* (2006.01)
- *C04B 38/06* (2006.01)
- *H05B 3/26* (2006.01)

(52) U.S. Cl.
CPC .............. *C04B 35/10* (2013.01); *C04B 35/64* (2013.01); *C04B 38/0054* (2013.01); *C04B 38/067* (2013.01); *C04B 38/068* (2013.01); *H05B 3/265* (2013.01); *C04B 2235/3217* (2013.01); *C04B 2235/3472* (2013.01); *C04B 2235/349* (2013.01); *C04B 2235/447* (2013.01)

(58) Field of Classification Search
CPC . C04B 38/0054; C04B 38/067; C04B 38/068; C04B 2235/3217; C04B 2235/3472; C04B 2235/349; C04B 2235/447; C04B 2111/00413; H05B 3/265
See application file for complete search history.

(56) References Cited

U.S. PATENT DOCUMENTS

| | | |
|---|---|---|
| 2015/0359262 A1 | 12/2015 | Liu et al. |
| 2016/0316819 A1 | 11/2016 | Zhou et al. |
| 2019/0038553 A1 | 2/2019 | Engqvist |

FOREIGN PATENT DOCUMENTS

| | | | |
|---|---|---|---|
| CN | 108451002 A | 8/2018 | |
| CN | 108774211 A | 11/2018 | |
| CN | 108794051 A | 11/2018 | |
| CN | 109288140 A | 2/2019 | |
| CN | 109527657 A | 3/2019 | |
| CN | 109674091 A | 4/2019 | |
| CN | 109832673 A | 6/2019 | |
| CN | 109875123 A | 6/2019 | |
| CN | 109984387 A | 7/2019 | |
| CN | 110054506 A | 7/2019 | |
| CN | 110122919 A | 8/2019 | |
| CN | 110150760 A | 8/2019 | |
| CN | 110194662 A | 9/2019 | |
| CN | 110477456 A | 11/2019 | |
| CN | 106535681 B | 1/2020 | |
| CN | 110876494 A | 3/2020 | |
| JP | 2019033747 A | 3/2019 | |
| RU | 2770806 C2 * | 4/2022 | ............. B29B 17/00 |
| WO | 2007004424 A1 | 1/2007 | |
| WO | 2016172959 A1 | 11/2016 | |
| WO | 2017156695 A1 | 9/2017 | |

OTHER PUBLICATIONS

Patent Cooperation Treaty, International Search Report, International Application No. PCT/CN2020/118561 (Dec. 30, 2020).
Patent Cooperation Treaty, Written Opinion of the International Searching Authority, International Application No. PCT/CN2020/118561 (Dec. 30, 2020).
Chinese Patent Office, First Office Action in Chinese Patent Application No. 201911176626.7(Feb. 3, 2021).
Chinese Patent Office, Notice of Registration and Notification to Grant Patent Right in Chinese Patent Application No. 201911176626.7 (Sep. 3, 2021).
Wenshan Lun et al., "A Study on the SiC Porous Ceramic's Factors of whose Aperture and Porosity in Flue-gas Filtration Method," Academic research, vol. 49, No. 5, pp. 30-32, 35 (Oct. 28, 2016).

* cited by examiner

VAPORIZER AND CERAMIC VAPORIZATION CORE THEREOF AND METHOD FOR FABRICATING CERAMIC VAPORIZATION CORE

CROSS-REFERENCE TO PRIOR APPLICATION

This application is a continuation of International Patent Application No. PCT/CN2020/118561, filed on Sep. 28, 2020. The disclosure of the application is hereby incorporated by reference herein.

FIELD

The present invention relates to electronic vaporization apparatuses, and more specifically, to a vaporizer, a ceramic vaporization core, and a method for preparing the ceramic vaporization core.

BACKGROUND

Nicotine in an e-liquid for electronic cigarettes generally has three forms: a free-base form, a singly protonated form, and a doubly protonated form. The absorption rates of different forms of nicotine at different positions of the respiratory system differ from each other, affecting the satisfaction of users when vaping electronic cigarettes. A lower degree of protonation of nicotine indicates a higher level of satisfaction.

The absorption rate of nicotine is slow in the mouth and the upper airway, and fast in the lung, which may reach 80% to 90%. Due to characteristics of the human body biofilm, nicotine in the protonated forms cannot enter blood through the biofilm in the lung, but nicotine in the free-base form can quickly pass through the biofilm. In addition, the buffer in the lung of a human body is slightly basic (PH=7.4), and a certain proportion of nicotine deposited in the lung will enter the blood in the singly protonated form and the free-base form.

In the related art, e-liquids including nicotine salts with a lower degree of protonation has been prepared, and the e-liquids can provide a good user experience by formulating the components in the free-base form and the singly protonated form. However, the process for preparing the nicotine salts is relatively complex and has technological barriers. In addition, diversified requirements of different users can only be met by preparing e-liquids with different formulations.

SUMMARY

In an embodiment, the invention provides a ceramic vaporization core, comprising: a porous body; and a heating body disposed on the porous body, wherein the porous body comprises at least one porous ceramic layer doped with a hydroxyl group-containing matrix.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
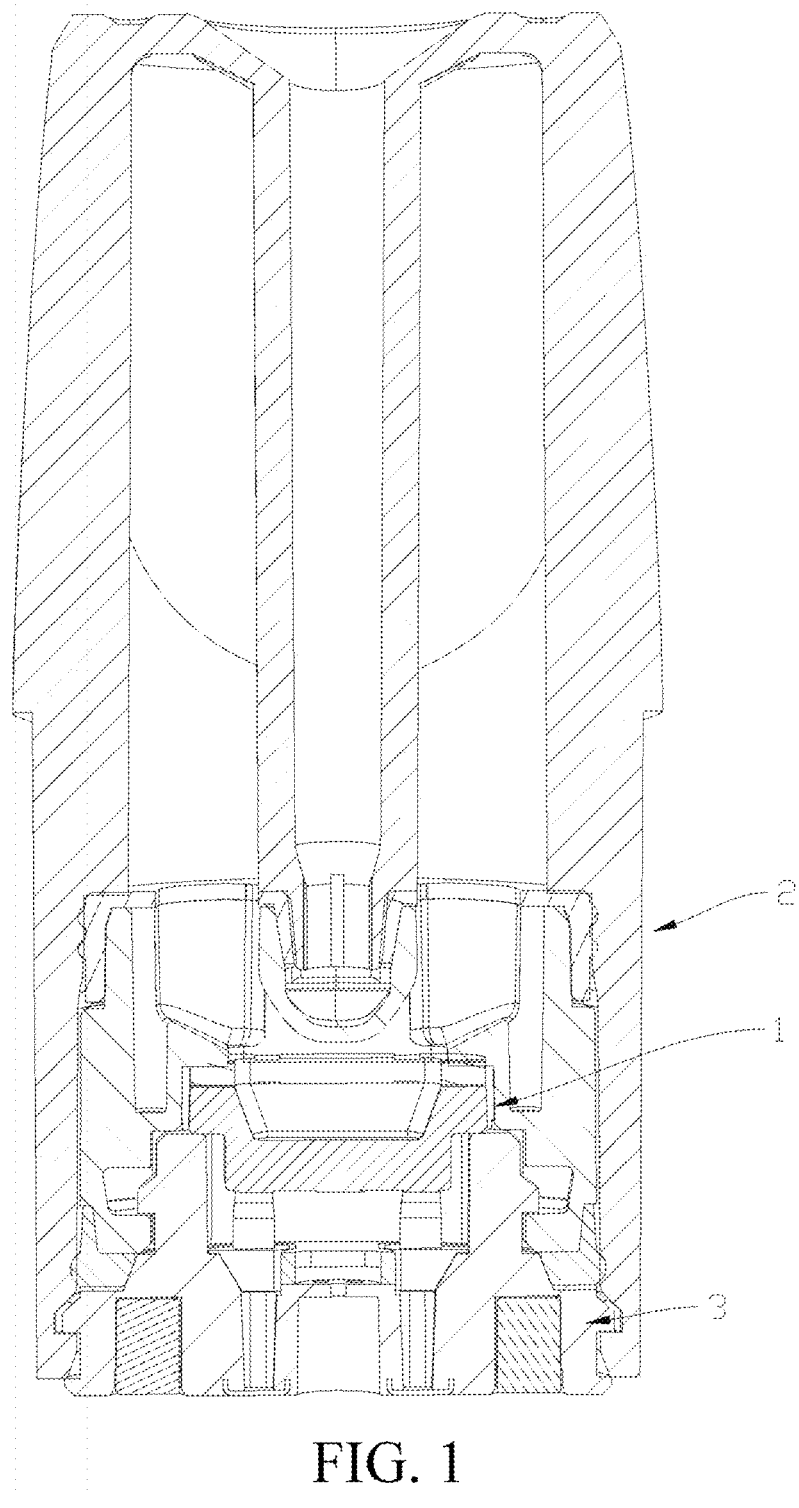
FIG. 1 is a cross-sectional view of a vaporizer according to some embodiments of the present invention.

In an embodiment, the invention provides an improved ceramic vaporization core, and further provides a method for preparing the improved ceramic vaporization core and a vaporizer.

In an embodiment, the invention provides a ceramic vaporization core, including a porous body and a heating body disposed on the porous body, the porous body including at least one porous ceramic layer doped with a hydroxyl group-containing matrix.

Preferably, the porous ceramic layer doped with the hydroxyl group-containing matrix includes components in parts by weight as follows: 35 to 55 parts by weight of a ceramic powder doped with a hydroxyl group compound and 25 to 45 parts by weight of a pore-forming agent.

Preferably, the ceramic powder doped with the hydroxyl group compound includes components in parts by weight as follows: 70 to 80 parts by weight of a main blank material, 10 to 15 parts by weight of albite, 10 to 15 parts by weight of fat clay, and 1 to 5 parts by weight of hydroxyapatite.

Preferably, the main blank material includes one or more of aluminum oxide, silicon oxide, silicon carbide, cordierite, silicon nitride, aluminum nitride, or mullite; and/or the pore-forming agent includes at least one of starch, graphite, polystyrene (PS) microspheres, or poly(methyl methacrylate) (PMMA) microspheres.

Preferably, the porous body further includes at least one microporous ceramic layer; the porous ceramic layer doped with the hydroxyl group-containing matrix and the microporous ceramic layer are sequentially disposed in a flow direction of an e-liquid; and a pore size of the microporous ceramic layer is less than a pore size of the porous ceramic layer doped with the hydroxyl group-containing matrix.

Preferably, the porous body includes a plurality of porous ceramic layers doped with the hydroxyl group-containing matrix and a plurality of microporous ceramic layers; and the porous ceramic layers doped with the hydroxyl group-containing matrix and the microporous ceramic layers are sequentially and alternately disposed in the flow direction of the e-liquid.

Preferably, a pore size d50 of the microporous ceramic layer is 0.1 μm to 5 μm; and/or a pore size d90 of the porous ceramic layer doped with the hydroxyl group-containing matrix is 10 μm to 200 μm.

Preferably, a porosity of the porous ceramic layer doped with the hydroxyl group-containing matrix is 40% to 75%; and/or a porosity of the microporous ceramic layer is 40% to 60%.

Preferably, the porous body includes a vaporization surface and a liquid absorbing surface disposed opposite to the vaporization surface;

the heating body is disposed on the vaporization surface; and the porous ceramic layer is disposed on one side away from the vaporization surface, and the liquid absorbing surface is formed on one side of the porous ceramic layer facing away from the vaporization surface.

The present invention further constructs a method for preparing a ceramic vaporization core, including:

mixing 70 to 80 parts by weight of a main blank material, 10 to 15 parts by weight of albite, 10 to 15 parts by weight of fat clay, and 1 to 5 parts by weight of hydroxyapatite to form a ceramic powder doped with a hydroxyl group compound;

mixing 35 to 55 parts by weight of the ceramic powder doped with the hydroxyl group compound and 25 to 45 parts by weight of a pore-forming agent to form a first mixed powder;

preparing the first mixed powder into a first blank; and sintering the first blank.

Preferably, before the preparing the first mixed powder into a first blank and sintering the first blank, the method further includes:

mixing 40 to 50 parts by weight of the main blank material, 20 to 30 parts by weight of albite, and 20 to 30 parts by weight of fat clay to form a ceramic powder;

mixing 80 to 90 parts by weight of the ceramic powder and 10 to 20 parts by weight of the pore-forming agent to form a second mixed powder;

preparing the second mixed powder into a second blank; and stacking the second blank with the first blank, to be sintered together with the first blank.

Preferably, before the sintering, the method further includes: inserting a heating body into one side of the second blank away from the first blank.

The present invention further constructs a vaporizer, including the ceramic vaporization core according to the present invention.

The following beneficial effects are achieved by implementing the vaporizer, the ceramic vaporization core, and the method for preparing the ceramic vaporization core of the present invention: The configuration of the at least one porous ceramic layer doped with the hydroxyl group-containing matrix in the ceramic vaporization core allows hydrogen ions in nicotine in an e-liquid that passes through the porous body and has not been vaporized to react with hydroxyl groups, to reduce the degree of protonation of nicotine in the e-liquid, thereby improving the absorption degree of nicotine in the lung and improving user experience.

In order to provide a clearer understanding of the technical features, the objectives, and the effects of the present invention, specific embodiments of the present invention are now described in detail with reference to the accompanying drawings.

It should be understood that, terms such as "front", "rear", "left", "right", "upper", "lower", "first", and "second" are merely for ease of describing the technical solutions of the present invention rather than indicating that the mentioned apparatus or component needs to have a particular difference. Therefore, these terms should be not construed as a limitation to the present invention. It should be noted that, when a component is considered to be "connected to" another component, the component may be directly connected to the another component, or an intermediate component may also be present. Unless otherwise defined, meanings of all technical and scientific terms used in this specification are the same as that usually understood by a person skilled in the technical field to which the present invention belongs. In this specification, terms used in the specification of the present invention are merely intended to describe objectives of the specific embodiments, but are not intended to limit the present invention.

FIG. 1 shows some exemplary embodiments of a vaporizer of the present invention. The vaporizer may include a base 3, a housing 2 sleeved on the base 3, and a ceramic vaporization core 1 of the present invention. An upper part of the housing 2 may be formed with a liquid storage cavity to store an e-liquid. The ceramic vaporization core may be disposed in the housing 2 and mounted on the base 3. An electrode component may be disposed on the base 3 to connect a power supply device to the ceramic vaporization core 1, to supply power to the ceramic vaporization core 1.

Figure 2:
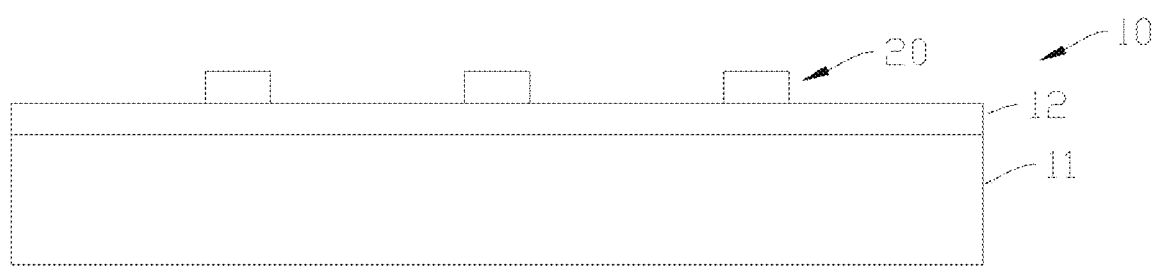
FIG. 2 is a schematic structural diagram of a ceramic vaporization core in the vaporizer shown in FIG. 1.

As shown in FIG. 2, the ceramic vaporization core 1 may include a porous body 10 and a heating body 20. The porous body 10 may be used for liquid absorbing and liquid storage, and includes a vaporization surface and a liquid absorbing surface. The vaporization surface may be disposed on one side away from the liquid storage cavity. The liquid absorbing surface may be disposed opposite to the vaporization surface and may be located on one side close to the liquid storage cavity, and may be configured to absorb the e-liquid from the liquid storage cavity. The heating body 20 may be disposed on the porous body 10. The heating body 20 may be disposed on an outer surface of the porous body 10. Specifically, the heating body may be disposed on the vaporization surface and may form an integral structure with the porous body 10 through sintering. It may be understood that, the heating body 20 is not limited to being disposed on the vaporization surface, but may also be buried in the porous body 10.

Further, in some embodiments, the porous body 10 may include a porous ceramic layer 11 doped with a hydroxyl group-containing matrix and a microporous ceramic layer 12. The porous ceramic layer 11 doped with the hydroxyl group-containing matrix and the microporous ceramic layer 12 are sequentially disposed in a flow direction of the e-liquid. Specifically, the porous ceramic layer 11 doped with the hydroxyl group-containing matrix is disposed on one side away from the vaporization surface, and the liquid absorbing surface may be formed on one side of the porous ceramic layer 11 facing away from the vaporization surface; and the microporous ceramic layer 12 is disposed on one side of the porous ceramic layer 11 doped with the hydroxyl group-containing matrix facing away from the liquid absorbing surface, and the vaporization surface is formed on one side of the microporous ceramic layer facing away from the porous ceramic layer 11 doped with the hydroxyl group-containing matrix. In some embodiments, the porous ceramic layer 11 doped with the hydroxyl group-containing matrix may be used for reducing the degree of protonation of the e-liquid; and provides an e-liquid guiding and storage function. A main function of the microporous ceramic layer 12 is to control a particle size of vaporized particles. It may be understood that, in some other embodiments, the number of the porous ceramic layers 11 doped with the hydroxyl group-containing matrix and the number of the microporous ceramic layers 12 are not limited to one, and may be more than one. When the porous body 10 includes a plurality of porous ceramic layers 11 doped with the hydroxyl group-containing matrix and a plurality of microporous ceramic layers 12, the porous ceramic layers 11 doped with the hydroxyl group-containing matrix and the microporous ceramic layer 12 may be sequentially and alternately disposed in the flow direction of the e-liquid.

Further, in some embodiments, the porous ceramic layer 11 doped with the hydroxyl group-containing matrix may be formed by mixing and sintering 35 to 55 parts by weight of a ceramic powder doped with a hydroxyl group compound and 25 to 45 parts by weight of a pore-forming agent. The ceramic powder doped with the hydroxyl group compound may include 70 to 80 parts by weight of a main blank material, 10 to 15 parts by weight of albite, 10 to 15 parts by weight of fat clay, and 1 to 5 parts by weight of hydroxyapatite. Specifically, in some embodiments, the main blank material may be aluminum oxide. It may be understood that, in some other embodiments, the main blank material may be not limited to aluminum oxide, and may be one or more of aluminum oxide, silicon oxide, silicon carbide, cordierite, silicon nitride, aluminum nitride, or mullite. The main blank material may be used for forming a blank. The albite may be used as an auxiliary ingredient to reduce drying shrinkage and deformation of the blank, improve the drying performance, and shorten the drying time, and may be used as a flux to be filled in the blank during sintering, to compact the blank to reduce pores and improve the light transmittance of the blank. The fat clay may be used for enhancing a bonding force of the main blank material. The hydroxyapatite may be used for reducing the degree of protonation of nicotine. A reaction mechanism of the hydroxyapatite with acid is: $Ca_{10}(PO_4)_6(OH)_2+2H^+=3Ca_3(PO_4)_2+Ca^{2+}+2H_2O$. In some embodiments, the pore-forming agent may be selected from at least one of starch, graphite, PS microspheres, or PMMA microspheres, and may be used for forming pores in the ceramic blank, to form the ceramic blank into the porous body 10.

Further, in some embodiments, the porous ceramic layer 11 doped with the hydroxyl group-containing matrix has a pore size d90 of 10 μm to 200 μm and a porosity of 40% to 75%, and may be configured for e-liquid guiding and storage and configured to reduce the degree of protonation of nicotine in the e-liquid before vaporization.

Further, in some embodiments, the microporous ceramic layer 12 may be made of a common ceramic material, and a pore size of the microporous ceramic layer 12 is less than a pore size of the porous ceramic layer 11 doped with the hydroxyl group-containing matrix, so that the particle size of the vaporized particles can be controlled, and the proportion of vapor passing through the microporous ceramic layer 12 that can be absorbed by the lung can be adjusted. In some embodiments, the microporous ceramic layer 12 has a pore size d50 of 0.1 μm to 5 μm and a porosity of 40% to 60%.

Further, in some embodiments, the heating body 20 may be a metal sheet, which may be partially embedded in the porous body 10 and configured to generate heat when being electrified, to vaporize the e-liquid close to the vaporization surface of the porous body 10. In some other embodiments, the heating body may be alternatively formed by sintering of a conductive slurry screen-printed on the porous body.

A method for preparing the ceramic vaporization core includes the following steps:

70 to 80 parts by weight of a main blank material, 10 to 15 parts by weight of albite, 10 to 15 parts by weight of fat clay, and 1 to 5 parts by weight of hydroxyapatite are mixed to form a ceramic powder doped with a hydroxyl group compound.

The main blank material is selected from one or more of aluminum oxide, silicon oxide, silicon carbide, cordierite, silicon nitride, aluminum nitride, or mullite. Specifically, the main blank material may be aluminum oxide.

35 to 55 parts by weight of the ceramic powder doped with the hydroxyl group compound and 25 to 45 parts by weight of a pore-forming agent are mixed to form a first mixed powder.

The pore-forming agent can volatilize at a high temperature to form pores, and may be selected from at least one of starch, graphite, PS microspheres, or PMMA microspheres.

The first mixed powder is prepared into a first blank.

Specifically, the first mixed powder is prepared into the first blank through dry pressing, hot pressing, or gel casting.

Before the preparing the first mixed powder into a first blank and sintering the first blank, the method further includes:

mixing 40 to 50 parts by weight of the main blank material, 20 to 30 parts by weight of albite, and 20 to 30 parts by weight of fat clay to form a ceramic powder.

The main blank material is selected from one or more of aluminum oxide, silicon oxide, silicon carbide, cordierite, silicon nitride, aluminum nitride, or mullite. Specifically, the main blank material may be aluminum oxide.

80 to 90 parts by weight of the ceramic powder and 10 to 20 parts by weight of the pore-forming agent are mixed to form a second mixed powder.

The pore-forming agent can volatilize at a high temperature to form pores, and may be selected from at least one of starch, graphite, PS microspheres, or PMMA microspheres.

The second mixed powder is prepared into a second blank.

Specifically, the second mixed powder is prepared into the second blank through dry pressing, hot pressing, or gel casting.

The second blank is stacked with the first blank, to be sintered together with the first blank.

Before the sintering, the method further includes: inserting a heating body into one side of the second blank away from the first blank; and sintering the first blank.

Specifically, the first blank, the second blank, and the heating body form an integral structure through sintering.

Specific examples are described below (unless otherwise particularly stated, the following examples do not include other components that are not clearly pointed out except inevitable impurities):

Example 1

1) Based on 100 parts by weight of powder, 70 to 80 parts by weight of aluminum oxide, 10 to 15 parts by weight of albite, 10 to 15 parts by weight of fat clay, and 1 to 2 parts by weight of hydroxyapatite were mixed to form a ceramic powder doped with a hydroxyl group compound. Based on 100 parts by weight of porous ceramic powder, 35 to 55 parts by weight of the ceramic powder doped with the hydroxyl group compound and 25 to 45 parts by weight of a pore-forming agent were mixed to form a first mixed powder. The first mixed powder was prepared into a first blank.

2) Based on 100 parts by weight of powder, 40 to 50 parts by weight of aluminum oxide, 20 to 30 parts by weight of albite, and 20 to 30 parts by weight of fat clay were mixed to form a ceramic powder. 80 to 90 parts by weight of the ceramic powder and 10 to 20 parts by weight of the pore-forming agent were mixed to form a second mixed powder. The second mixed powder was prepared into a second blank.

3) The second blank was stacked with the first blank, a heating body was inserted into one side of the second blank away from the first blank, and the first blank and the second blank were sintered together to form a ceramic vaporization core.

Example 2

1) Based on 100 parts by weight of powder, 70 to 80 parts by weight of aluminum oxide, 10 to 15 parts by weight of albite, 10 to 15 parts by weight of fat clay, and 2 to 3 parts by weight of hydroxyapatite were mixed to form a ceramic powder doped with a hydroxyl group compound. Based on 100 parts by weight of porous ceramic powder, 35 to 55 parts by weight of the ceramic powder doped with the hydroxyl group compound and 25 to 45 parts by weight of a pore-forming agent were mixed to form a first mixed powder. The first mixed powder was prepared into a first blank.
2) Based on 100 parts by weight of powder, 40 to 50 parts by weight of aluminum oxide, 20 to 30 parts by weight of albite, and 20 to 30 parts by weight of fat clay were mixed to form a ceramic powder. 80 to 90 parts by weight of the ceramic powder and 10 to 20 parts by weight of the pore-forming agent were mixed to form a second mixed powder. The second mixed powder was prepared into a second blank.
3) The second blank was stacked with the first blank, a heating body was inserted into one side of the second blank away from the first blank, and the first blank and the second blank were sintered together to form a ceramic vaporization core.

Example 3

1) Based on 100 parts by weight of powder, 70 to 80 parts by weight of aluminum oxide, 10 to 15 parts by weight of albite, 10 to 15 parts by weight of fat clay, and 3 to 4 parts by weight of hydroxyapatite were mixed to form a ceramic powder doped with a hydroxyl group compound. Based on 100 parts by weight of porous ceramic powder, 35 to 55 parts by weight of the ceramic powder doped with the hydroxyl group compound and 25 to 45 parts by weight of a pore-forming agent were mixed to form a first mixed powder. The first mixed powder was prepared into a first blank.
2) Based on 100 parts by weight of powder, 40 to 50 parts by weight of aluminum oxide, 20 to 30 parts by weight of albite, and 20 to 30 parts by weight of fat clay were mixed to form a ceramic powder. 80 to 90 parts by weight of the ceramic powder and 10 to 20 parts by weight of the pore-forming agent were mixed to form a second mixed powder. The second mixed powder was prepared into a second blank.
3) The second blank was stacked with the first blank, a heating body was inserted into one side of the second blank away from the first blank, and the first blank and the second blank were sintered together to form a ceramic vaporization core.

Example 4

1) Based on 100 parts by weight of powder, 70 to 80 parts by weight of aluminum oxide, 10 to 15 parts by weight of albite, 10 to 15 parts by weight of fat clay, and 4 to 5 parts by weight of hydroxyapatite were mixed to form a ceramic powder doped with a hydroxyl group compound. Based on 100 parts by weight of porous ceramic powder, 35 to 55 parts by weight of the ceramic powder doped with the hydroxyl group compound and 25 to 45 parts by weight of a pore-forming agent were mixed to form a first mixed powder. The first mixed powder was prepared into a first blank;
2) Based on 100 parts by weight of powder, 40 to 50 parts by weight of aluminum oxide, 20 to 30 parts by weight of albite, and 20 to 30 parts by weight of fat clay were mixed to form a ceramic powder. 80 to 90 parts by weight of the ceramic powder and 10 to 20 parts by weight of the pore-forming agent were mixed to form a second mixed powder. The second mixed powder was prepared into a second blank.
3) The second blank was stacked with the first blank, a heating body was inserted into one side of the second blank away from the first blank, and the first blank and the second blank were sintered together to form a ceramic vaporization core.

1. Analysis on the Mechanism of Reducing the Degree of Protonation of Nicotine by Hydroxyapatite 1.1 Reaction Mechanism of Hydroxyapatite with Acid:

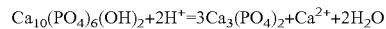

$$Ca_{10}(PO_4)_6(OH)_2 + 2H^+ = 3Ca_3(PO_4)_2 + Ca^{2+} + 2H_2O$$

Nicotine may be present in the e-liquid in the following three forms:

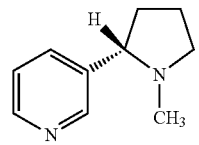

Free base form Nic

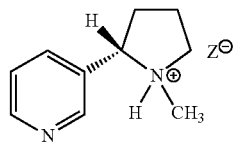

Singly protonated form NicH$^+$

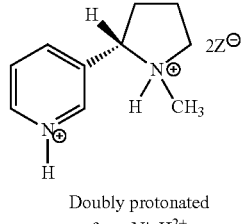

Doubly protonated form NicH$_2^{2+}$

The relationship of conversion between the three forms of nicotine is as follows:

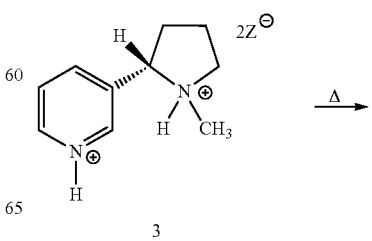

-continued

[Chemical structures: compound 2 (doubly protonated NicH₂⁺ with Z⁻) → Δ → compound 1 (singly protonated NicH⁺)]

A doubly protonated form $NicH_2^{2+}$ is primarily ionized to generate one $H^+$ and a singly protonated form $NicH^+$. The singly protonated form $NicH^+$ is then ionized to generate one $H^+$ and a free-base form Nic, which is equivalent to a secondary ionization of the doubly protonated form $NicH_2^{2+}$. Generally, the primary ionization is more likely to occur than the secondary ionization.

As can be known from 1 to 3, after a nicotine-containing e-liquid passes through the ceramic vaporization core doped with hydroxyapatite, $H^+$ generated from the ionization of a large part of the doubly protonated form $NicH_2^{2+}$ and a small part of the singly protonated form $NicH^+$ in the nicotine reacts with the hydroxyapatite to generate the singly protonated form $NicH^+$ and the free-base nicotine.

2. Mechanism of Regulating the Reduction in the Degree of Protonation of Nicotine in the e-Liquid 2.1 Content of Nicotine in the e-Liquid Using a cartridge with a 2 mL e-liquid storage tank as an example, the content of nicotine in the nicotine-containing e-liquid is generally 3.6 mg/mL, 2.4 mg/mL, 1.8 mg/mL, 1.2 mg/mL, and 0.6 mg/mL. The following calculation is performed by using a cartridge with a 2 mL e-liquid storage tank having a nicotine content of 1.8 mg/mL:

nicotine content: 1.8 mg/mL*2 mL=3.6 mg.

Figure 3:
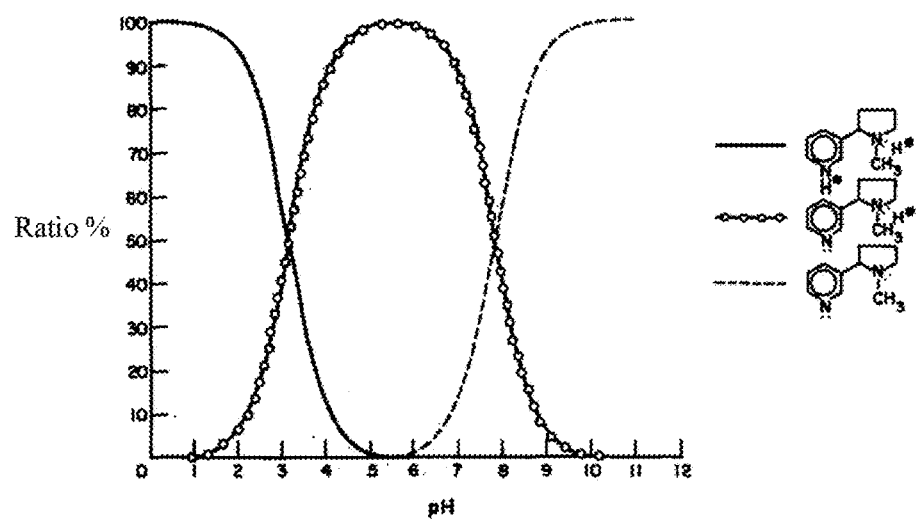
FIG. 3 shows curves illustrating the distribution of contents of nicotine in different forms under different pH values.

The contents of nicotine in different forms may be directly reflected on the pH value of the e-liquid, as shown in FIG. 3. The experimental data is as follows:

As can be seen from FIG. 3, when the pH value was 7, the nicotine was present in the singly protonated form and free-base form, and the ratio of the singly protonated form to the free-base form was 9:1; and when the pH value was 3.2, the nicotine was present in the doubly protonated form and free-base form, and the ratio of the doubly protonated form to the free-base form was 5:5. Calculation is performed below by using examples in which the pH values are 3.2 and 7 respectively.

a. When the pH value is 3.2, the contents of the substances in the e-liquid are as follows:

doubly protonated form: 3.6 mg*50%=1.8 mg, i.e., 1.8 mg/164.23 (mg/mmol)=0.011 mmol (the molecular weight of nicotine in the doubly protonated form is 164.23); and free-base form: 1.8 mg (the molecular weight of nicotine in the free-base form is 162.23).

To reduce the degree of protonation, i.e., to change the doubly protonated form to the singly protonated form, an amount of hydroxyapatite that needs to be added is:

0.011 mmol*0.5*1004 mg/mmol=5.522 mg.

After the e-liquid reacts with the hydroxyapatite, the nicotine is present in the singly protonated form and free-base form, and the ratio of the singly protonated form to the free-base form is 5:5.

b. When the pH value is 7, the contents of the substances in the e-liquid are as follows:

singly protonated form: 3.6 mg*90%=3.24 mg, i.e., 3.24 mg/163.23 (mg/mmol)=0.020 mmol (the molecular weight of nicotine in the singly protonated form is 163.23); and free-base form: 0.36 mg (the molecular weight of nicotine in free-base form is 162.23).

To reduce the degree of protonation, i.e., to change part of the nicotine in the singly protonated form to the free-base form, an amount of hydroxyapatite that needs to be added is:

if the ratio of the singly protonated form to the free-base form is 8:2, the amount is 0.020 mmol*(1/9)0.5*1004 mg/mmol=1.116 mg;

if the ratio of the singly protonated form to the free-base form is 7:3, the amount is 0.020 mmol*(2/9)0.5*1004 mg/mmol=2.232 mg;

if the ratio of the singly protonated form to the free-base form is 6:4, the amount is 0.020 mmol*(3/9)0.5*1004 mg/mmol=3.348 mg; and if the ratio of the singly protonated form to the free-base form is 5:5, the amount is 0.020 mmol*(4/9)0.5*1004 mg/mmol=4.464 mg.

3. pH Comparison Data after the e-Liquid Passes Through Ceramic Vaporization Core Doped with Hydroxyapatite The variations in the pH after the e-liquid passed through the ceramic vaporization core doped with hydroxyapatite were measured using a pH meter. The data is as shown in the following table.

| Initial pH of e-liquid | pH after passing through ceramic vaporization core doped with hydroxyapatite |
| --- | --- |
| 5.0 | 7.0 |
| 5.5 | 7.5 |
| 6.0 | 7.5 |
| 6.5 | 7.5 |

Figure 4:
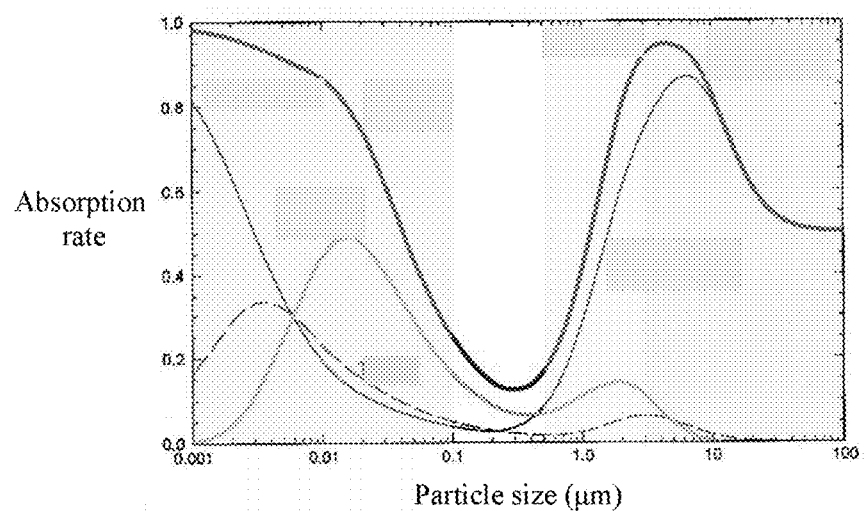
FIG. 4 shows curves illustrating the absorption of an aerosol in different parts of a human body.

4. Requirements on the Particle Size of Nicotine Particles for Absorption by the Lung of Human Body FIG. 4 shows experimental data of the absorption of an aerosol in different parts of a human body. As can be known from FIG. 4, the alveoli mainly absorbed aerosol particles with a particle size of less than 100 nm.

5. Adjustment of the Particle Size Distribution of Aerosol Particles by Controlling the Ceramic Pore Size Vapor passing through a porous ceramic was collected, and the particle size distribution of the vapor was tested. The results are as shown in the following table:

| Pore size d50/μm | d50 of vapor after passing through porous ceramic vaporization core/nm | d90 of vapor after passing through porous ceramic vaporization core/nm |
| --- | --- | --- |
| 0.1 | 20 | 45 |
| 1 | 50 | 90 |
| 5 | 100 | 130 |
| 10 | 150 | 250 |
| 100 | 500 | 900 |

As can be known from the data in the foregoing table, when d50 of the porous ceramic was less than 5 μm, 90% of particles of vapor generated by the ceramic vaporization core had a particle size of not greater than 100 nm. As can be known from 4 and 5, by controlling the pore size distribution of the porous ceramic vaporization core to make its d50 less than 5 μm, the particle size d50 of the vapor was not greater than 100 nm, and particles having such a particle size can easily enter the lung and can easily solidify to be transmitted to and deposited in the lung, thereby improving the absorption rate in the lung.

6. Description of Actual Effects Achieved by the Vaporization Core of this Patent with Reference to the Experimental Data 6.1 Comparison of Effects of Reducing the Degree of Protonation for a Same e-Liquid

| Type of vaporization core | Initial pH of e-liquid | pH of e-liquid after passing through vaporization core |
|---|---|---|
| Conventional ceramic vaporization core | 6 | 6 |
| Ceramic vaporization core doped with hydroxyapatite | 6 | 7.5 |

6.2 Comparison of Aerosol Particle Size Distributions Collected after Vaporization at the Same Power

| Type of vaporization core | Aerosol d50/μm | Aerosol d90/μm |
|---|---|---|
| Conventional ceramic vaporization core | 150 | 250 |
| Ceramic vaporization core of this application | 80 | 110 |

The foregoing two sets of experimental data show that the vaporization core prepared according to the embodiments of this application can reduce the degree of protonation of nicotine in the e-liquid, and can adjust the particle size distribution of the aerosol after vaporization, so that most particles have a particle size of less than 100 nm, and can easily solidify to be transmitted to and deposited in the lung, thereby improving the absorption rate in the lung.

6.3 Comparison of Sensory Evaluation at the Same Power

| Type of vaporization core | Sense of throat strike | Lung-inhaling satisfaction |
|---|---|---|
| Conventional ceramic vaporization core | Relatively strong | Mild |
| Ceramic vaporization core of this application | Strong | Relatively strong |

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ceramic vaporization core, comprising:
   a porous body; and
   a heating body disposed on the porous body,
   wherein the porous body comprises at least one porous ceramic layer doped with a hydroxyl group-containing matrix, and wherein the porous ceramic layer doped with the hydroxyl group-containing matrix comprises components in parts by weight as follows:
   35 to 55 parts by weight of a ceramic powder doped with a hydroxyl group compound; and
   25 to 45 parts by weight of a pore-forming agent.

2. The ceramic vaporization core of claim 1, wherein the ceramic powder doped with the hydroxyl group compound comprises components in parts by weight as follows:
   70 to 80 parts by weight of a main blank material;
   10 to 15 parts by weight of albite;
   10 to 15 parts by weight of fat clay; and
   1 to 5 parts by weight of hydroxyapatite.

3. The ceramic vaporization core of claim 2, wherein the main blank material comprises one or more of: aluminum oxide, silicon oxide, silicon carbide, cordierite, silicon nitride, aluminum nitride, or mullite, and/or
   wherein the pore-forming agent comprises at least one of: starch, graphite, polystyrene microspheres, or poly(methyl methacrylate) microspheres.

4. The ceramic vaporization core of claim 1, wherein the porous body further comprises at least one microporous ceramic layer,
   wherein the porous ceramic layer doped with the hydroxyl group-containing matrix and the microporous ceramic layer are sequentially disposed in a flow direction of an e-liquid, and
   wherein a pore size of the microporous ceramic layer is less than a pore size of the porous ceramic layer doped with the hydroxyl group-containing matrix.

5. The ceramic vaporization core of claim 4, wherein the porous body comprises a plurality of porous ceramic layers doped with the hydroxyl group-containing matrix and a plurality of microporous ceramic layers, and
   wherein the porous ceramic layers doped with the hydroxyl group-containing matrix and the microporous ceramic layers are sequentially and alternately disposed in the flow direction of the e-liquid.

6. The ceramic vaporization core of claim 4, wherein a pore size of the microporous ceramic layer is 0.1 μm to 5 μm, and/or
   wherein a pore size of the porous ceramic layer doped with the hydroxyl group-containing matrix is 10 μm to 200 μm.

7. The ceramic vaporization core of claim 4, wherein a porosity of the porous ceramic layer doped with the hydroxyl group-containing matrix is 40% to 75%, and/or
   wherein a porosity of the microporous ceramic layer is 40% to 60%.

8. The ceramic vaporization core of claim 1, wherein the porous body comprises a vaporization surface and a liquid absorbing surface disposed opposite to the vaporization surface,
   wherein the heating body is disposed on the vaporization surface, wherein the porous ceramic layer is disposed on one side away from the vaporization surface, and wherein the liquid absorbing surface is formed on one side of the porous ceramic layer facing away from the vaporization surface.

9. A vaporizer, comprising:

the ceramic vaporization core of claim 1.

10. A method for preparing a ceramic vaporization core, comprising:

mixing 70 to 80 parts by weight of a main blank material, 10 to 15 parts by weight of albite, 10 to 15 parts by weight of fat clay, and 1 to 5 parts by weight of hydroxyapatite to form a ceramic powder doped with a hydroxyl group compound;

mixing 35 to 55 parts by weight of the ceramic powder doped with the hydroxyl group compound and 25 to 45 parts by weight of a pore-forming agent to form a first mixed powder;

preparing the first mixed powder into a first blank; and sintering the first blank.

11. The method for preparing a ceramic vaporization core of claim 10, wherein before the preparing the first mixed powder into a first blank and sintering the first blank, the method further comprises:

mixing 40 to 50 parts by weight of the main blank material, 20 to 30 parts by weight of albite, and 20 to 30 parts by weight of fat clay to form a ceramic powder;

mixing 80 to 90 parts by weight of the ceramic powder and 10 to 20 parts by weight of the pore-forming agent to form a second mixed powder;

preparing the second mixed powder into a second blank; and stacking the second blank with the first blank, to be sintered together with the first blank.

12. The method for preparing a ceramic vaporization core of claim 11, wherein before the sintering, the method further comprises:

inserting a heating body into one side of the second blank away from the first blank.

\* \* \* \* \*